United States Patent

[11] 3,608,978

| [72] | Inventor | James C. Neisch<br>Warren, Mich. |
|---|---|---|
| [21] | Appl. No. | 37,396 |
| [22] | Filed | May 1, 1970 |
| [45] | Patented | Sept. 28, 1971 |
| [73] | Assignee | Rockwell-Standard Company<br>Pittsburgh, Pa.<br>Continuation of application Ser. No.<br>709,706, Mar. 11, 1968, now abandoned. |

[54] ANTISKID BRAKE CONTROL
9 Claims, 3 Drawing Figs.

[52] U.S. Cl. .................................................. 303/21 EB,
188/181 C, 303/20
[51] Int. Cl. .................................................. B60t 8/08
[50] Field of Search ........................................... 188/181;
235/150, 150.2; 307/254; 303/20; 303/21

[56] References Cited
UNITED STATES PATENTS

| 3,245,213 | 4/1966 | Thompson et al. ........... | 303/21 |
| 3,260,555 | 7/1966 | Packer ......................... | 303/21 |
| 3,450,444 | 6/1969 | Ballard ........................ | 303/21 EB |

*Primary Examiner*—Milton Buchler
*Assistant Examiner*—Stephen G. Kunin
*Attorneys*—E. Dennis O'Connor, Richard A. Speer and Floyd S. Levison

ABSTRACT: An automotive braking control system in which the rotational velocity of at least one of a set of wheels, usually the front wheels, provides a reference for comparison with the rotational velocity of at least one of another set of wheels to provide a signal to limit the braking effort at said other wheels, to a level just below that, which will cause said other wheels to lock up, except when said front wheels are first locked.

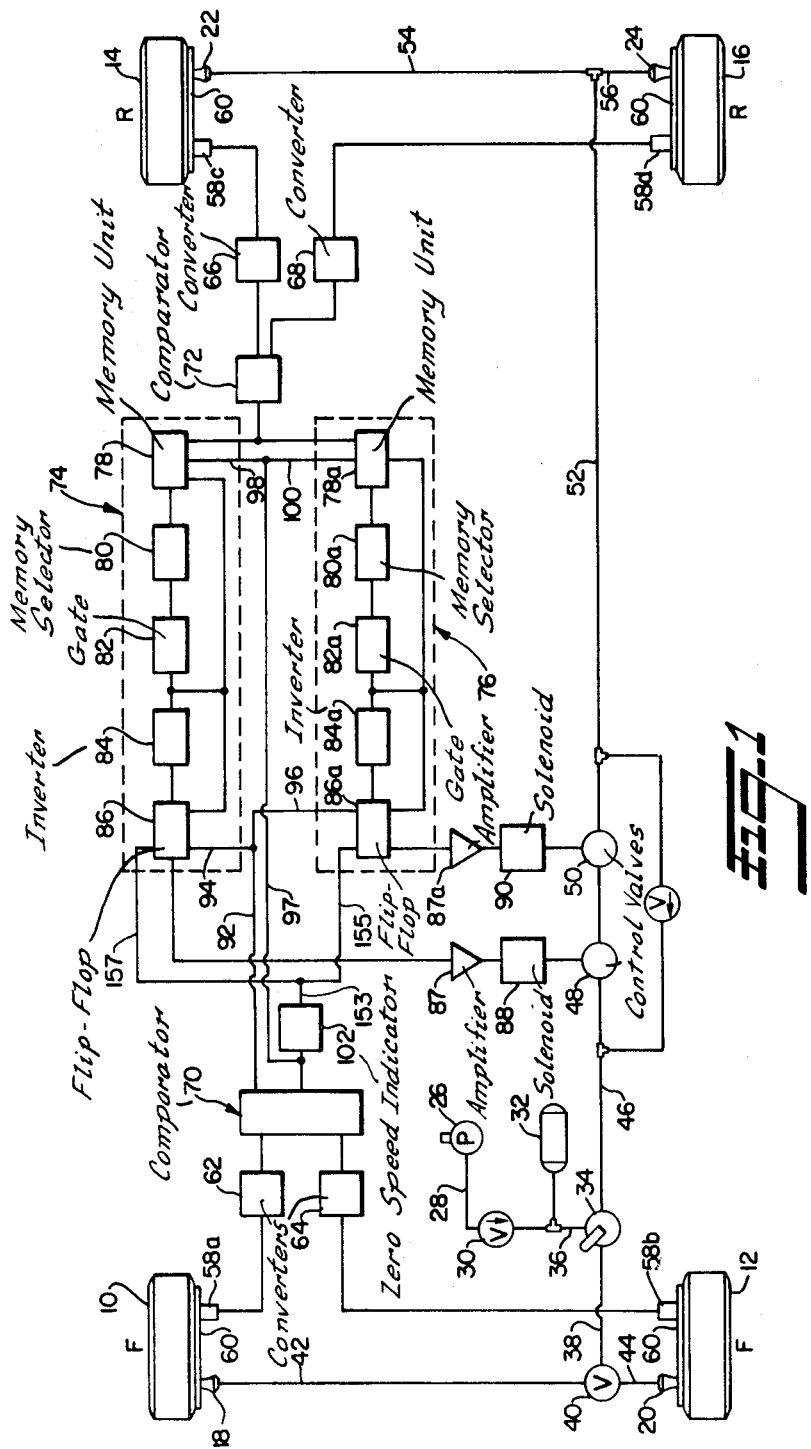

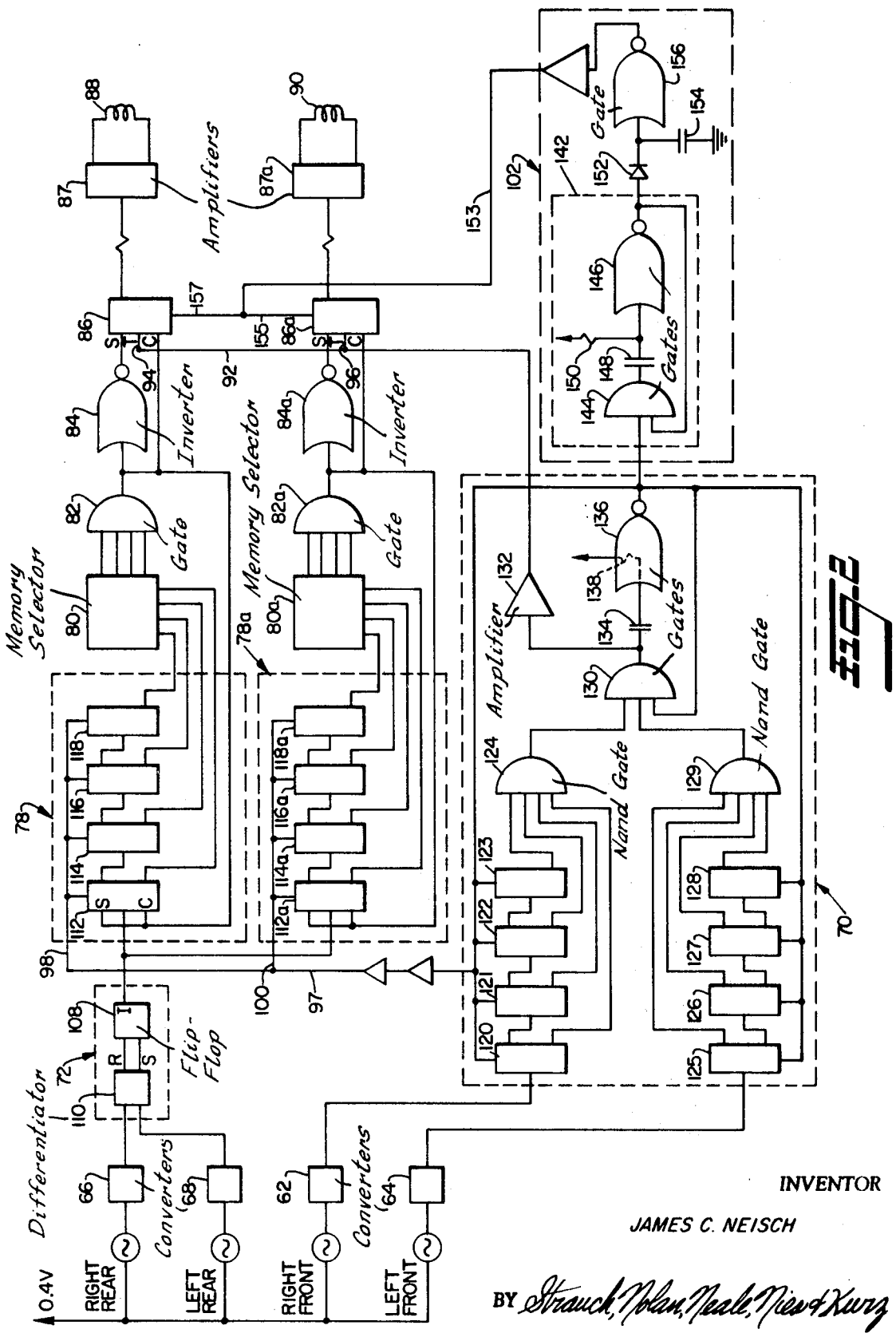

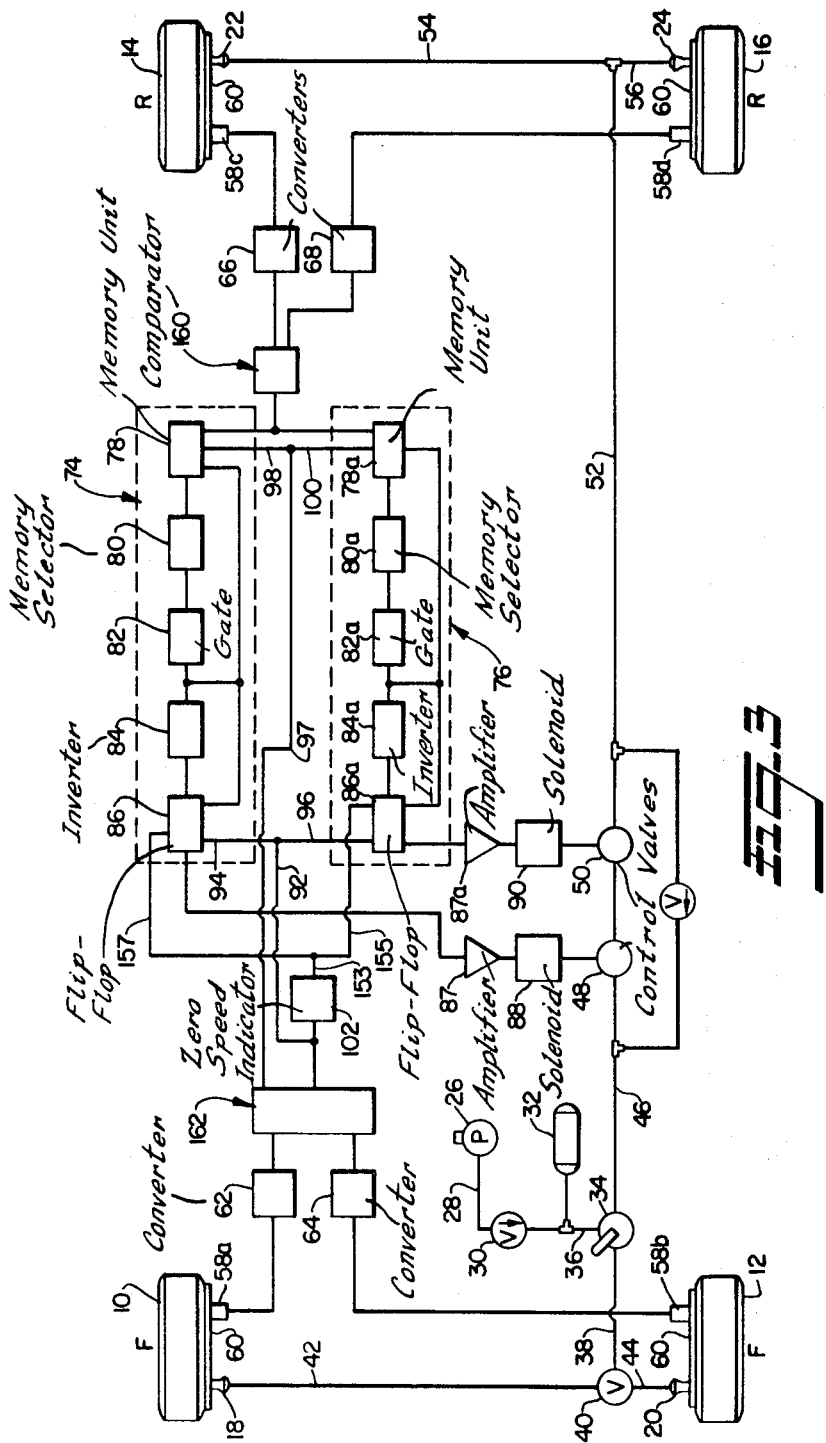

ANTISKID BRAKE CONTROL

RELATED APPLICATIONS

This application is a continuation of applicant's copending application Ser. No. 709,706, now abandoned filed Mar. 1, 1968 for Brake System.

Related brake control systems are disclosed and claimed in copending applications, Ser. No. 557,739, filed June 15, 1966, for Brake Systems, now U.S. Pat. No. 3,503,654 issued Mar. 31, 1970, and Ser. No. 662,448, filed Aug. 22, 1967, for Brake System, now abandoned in view of continuation application Ser. No. 866,152 filed Oct. 10, 1969 also now abandoned in view of continuation application Ser. No. 41,765 filed June 4, 1970, and each owned by applicant's assignee.

BACKGROUND OF THE INVENTION

It is now generally recognized that the retention of directional control over a vehicle during braking is often an important in achieving safe operation as the provision of brakes of adequate capacity and reliability.

It is also known that directional control can be maintained only when the vehicle wheels are in rolling contact with the road surface. Rear-wheel lock will create an over steer condition often resulting in a spin, whereas front wheel lock causes loss of steering control. Experience has also shown that it is usually beyond the skill of the vehicle operator to achieve the ideal braking condition, particularly under emergency conditions, that is, to apply the brakes with a force slightly less than the value which will cause any of the wheels to lock. Accordingly, many prior attempts have been made to provide an automatic brake control system which, in effect, overrides and limits the braking effort applied to the wheels to avoid wheel lock. Many of these systems, however, have introduced other undesirable actions into the braking system. For example, the prior systems, which are responsive to a wheel lock condition are unsatisfactory since they first permit a dangerous situation to develop and then correct it, resulting in a jerky or uneven braking action. Other systems involve pulsing the brake pressure delivered to the wheel which is about to lock, which materially reduces the effective braking action of one or more of the wheels and may materially increase the stopping distance. Thus, while many of the systems do achieve directional stability during braking this result is achieved only at the expense of increased stopping distances. Also, in many cases the prior systems are of such complexity or bulk or are so costly as to preclude their adoption on commercial vehicles.

One of the most successful prior proposals is the control system disclosed and claimed in the aforesaid and copending application, Ser. No. 662,448. That system permits normal operation of all of the brakes under moderate braking loads, and, under heavier braking loads detects minor and major tendencies of the rear wheels to lock and holds the braking effort constant, when the minor tendency is detected and reduces the braking effort when the major tendency is detected, thus, preventing wheel lock while applying maximum braking effort at a level just below the level at which wheel lock occurs. The prior system also is effective to permit full braking pressure to be developed at the front wheels of the vehicle at all times. If the applied braking effort is sufficient to lock the front wheels the rear wheels are also permitted to lock, thus permitting the application of full braking effort under extreme emergency conditions.

The prior control mechanism includes an electromechanical system, which effectively compares the average rotational velocity of the front wheels with the average rotational velocity of the other wheels or wheel sets. When a relative decrease in the average rotational velocity of the rear wheels is detected indicating incipient wheel lock, a hold circuit is actuated which maintains the braking effort constant at the rear wheels. The hold circuit is maintained until the detected incipient wheel lock is eliminated. If, however, the differential between the average speed of the rear wheels and the average speed of the front wheels is increased, indicating a further tendency of the rear wheels to lock, a bleed circuit is actuated to reduce the braking effort at the rear wheels until the increased tendency of the rear wheels to lock is eliminated.

SUMMARY OF THE INVENTION

It is the major object of the present invention to provide improved brake control systems of the general type disclosed in the aforesaid copending application, Ser. No. 662,448.

More specifically, the present invention provides novel logic systems for generating control signals to actuate the mechanical components of the brake control system.

In accordance with the preferred form of the present invention the logic system constantly produces a signal indicative of the speed of each front wheel and the speed of each rear wheel. It then compares the speed of the slowest rear wheel with the speed of the fastest front wheel. If these wheels are rotating at essentially the same velocity then the control system is inactive and the brakes are operated in a normal manner. If, however, the speed of the slowest rear wheel falls below the speed of the fastest front wheel by a first predetermined amount, a control signal is generated which effectively prevents the application of further braking effort to each of the rear wheels. This condition is maintained until the continued comparison of the speed of the slowest rear wheel and the speed of the fastest front wheel indicates that the speed differential has increased or decreased. In the latter case the control system is deenergized and the braking system returns to its normal mode of operation. In the former case a further control signal is generated, which reduces the braking effort applied to each of the rear wheels. This signal is continued until the continuing comparison of the wheel speeds indicates that the excessive wheel speed differential has been eliminated.

Since this system comes into play only when the speed of at least one of the rear wheels is slower than the speed of at least one of the front wheels, full braking application is permitted to all wheels in the event of front wheel lockup.

In another form, the logic system of the present invention compares the average velocity of the front wheels with the average velocity of the rear wheels. In all other respects this form of the invention is the same as the preferred form, described above.

The logic systems of the present invention include only readily available, relatively inexpensive components which are of small size and lightweight and possess a high degree of reliability.

It is, accordingly, a further major object of the present invention to provide an improved brake control system which is inexpensive, lightweight and compact and which is, thus, suitable for use in a wide variety of vehicles.

It is an additional object of the present invention to provide improved brake control systems which are more sensitive than prior systems and which, thus, provide a closer approximation of the ideal braking conditions under a wide variety of operating conditions.

Additional objects and advantages of the present invention will become apparent as the description proceeds in connection with the accompanying drawings.

DESCRIPTION OF DRAWINGS

FIG. 1 is a schematic illustration of an improved brake control system constructed in accordance with the present invention, particularly adapted for installation on a four-wheel vehicle;

FIG. 2 is a more detailed diagram of the electrical circuit of the control system of FIG. 1; and FIG. 3 is a schematic illustration like FIG. 1 but showing an alternate form of the invention.

DESCRIPTION OF PREFERRED EMBODIMENT

For present purposes the control system of the present invention will be disclosed as applied to a passenger vehicle or light truck, having front wheels 10 and 12 and rear wheels 14 and 16, equipped with conventional airbrake mechanisms 18, 20, 22, and 24.

The basic brake system is completely conventional and comprises the usual engine-driven compressor 26 which delivers pressurized air through conduit 28 and a check valve 30 to a reservoir 32 connected to the inlet side of the usual foot operated brake application valve 34 through a conduit 36. When the valve 34 is operated, air under pressure is supplied through conduit 38, valve 40 and conduits 42 and 44 to actuate the front wheel brakes 18 and 20. Compressed air is also simultaneously delivered through conduit 46 to control valves 48 and 50, described in detail below, conduit 52 and conduits 54 and 56 to the rear wheel brake mechanisms 22 and 24. Under normal moderate braking conditions the valves 48 and 50 have no effect on the system and the pressure delivered to the conduit 46 is supplied without modification to the rear wheel brakes.

Each of the vehicle wheels is equipped with a mechanism for detecting the rotational velocity of the wheel. Preferably, the units are identical and each comprises an electromagnetic pickup transducer, the transducers being designated at 58a, 58b, 58c and 58d, respectively. Each transducer has a permanent magnet pole piece facing the associated wheel brake drum which is provided with a series of circumferentially uniformly spaced magnetic elements which may comprise a series of notches and teeth formed in rings 60 carried by the individual wheels.

Since the various components of the logic system of the present invention are actuated by pulses the sinusoidal output from the magnetic transducers must be converted to pulses. For this purpose conventional monostable multivibrators 62, 64, 66 and 68 are employed. These converters 62–68, thus, each generate pulse signals having a frequency which is a direct function of the speed of the individual wheels with which they are associated.

The pulse outputs of the converters 62 and 64 are fed to a comparator device 70, described below, which produces a pulsed output signal, the frequency of which is a function of only the faster of the two front wheels 10 or 12.

Similarly, the pulsed output signals of the converters 66 and 68 are fed to a comparator device 72, described below, which produces a pulsed output signal, the frequency of which is a function of the rotational velocity of only the slower of the two rear wheels 22 and 24. The pulsed output signal of the comparator 72 is fed to two identical logic switches 74 and 76. As explained in detail below each of the switches includes a frequency divider and memory unit 78, 78a, a memory selector 80, 80a and gate 82, 82a, an inverter 84, 84a, and a flip-flop 86, 86a. The logic switch 74 controls the operation of the solenoid 88 of the valve 48 while the switch 76 controls the operation of a solenoid 90 of the valve 50.

The pulsed output of the front wheel comparator 70 is also fed to the switches 74 and 76 through leads 92, 94, 96, 97, 98 and 100. As explained in detail below the switch 74 is triggered to energize the solenoid 88 for the valve 48 when the speed of the slowest rear wheel is a predetermined amount less than the speed of the fastest front wheel and the switch 76 is triggered to energize the solenoid 90 of valve 50 whenever the speed of the slowest rear wheel is less than the speed of the fastest front wheel by greater predetermined amount.

The switches 74 and 76 are also under the control of a zero speed detector 102 which effectively prevents operation of either of the solenoids 88 or 90 when the rotational velocity of the front wheels reaches or approaches zero. Thus, the unit 102 effectively prevents operation of the valves when the vehicle is at rest or when the front wheels are locked.

Referring now more particularly to FIG. 2, which shows certain of the components of the logic system in greater detail, the comparator 72 is essentially an RS flip-flop 108 with a speed indicating signal from one rear wheel fed to the S terminal and the speed indicating signal of the other rear wheel fed to the R terminal. Thus, the signal from one wheel causes the unit to flip while the signal from the other wheel causes the unit to flop. Since the output is taken only from the I terminal, the output signal will always be indicative of the speed of the slowest wheel. To reduce the possibility that input occurs simultaneously at the R and S terminals the inputs are differentiated into 10 microsecond pulses by the standard differentiator 110.

The output of the comparator 72 is divided and fed to the two logic switches 74 and 76 (FIG. 1), which are of essentially identical construction. Accordingly, only one will be described in detail with continuing reference to FIG. 2.

The frequency divider comprising a JK flip-flops 112, 114, 116 and 118 is so connected that the frequency of the output of the unit 118 is the frequency of the input signal delivered by the comparator 72 divided by 15. The logic zero outputs of the flip-flops 112, 114, 116 and 118 are connected through the memory selector 80 to the NAND gate 82 which produces the signal when all of its inputs are logic zero. The memory selector 80 is optionally provided to permit it selection of the count produced by the frequency divider. It comprises switches (not shown) in each of the logic zero outputs of the flip-flops 112, 114, 116 and 118. Thus, by varying the setting of the switches the NAND gate 82 will produce a logic 1 signal for any desired member of pulses of input signal delivered by the comparator 72 from 1 to 15.

The signal of the NAND gate 82 is fed back to the S and C inputs of the flip-flop 112 to inhibit any further action of the flip-flop 112 in response to further signals from the comparator 72. The signal from the NAND gate 82 is also delivered to the inverter 84 which inverts the signal and sends it to the S terminal of the JK flip-flop 86. The NAND gate signal is also sent to the C terminal of the flip-flop 86 to render the flip-flop responsive to a signal to the T input delivered by the comparator 70.

The logic switch 76 is of identical construction except that the memory selector is so set that fewer pulses of the comparator 72 are required before a signal is delivered to the S and C terminals of the flip-flop 86a. The flip-flops 86 and 86a are so arranged that they change states from low to high only when a signal is impressed at the timer or T terminal. Usually the signal supplied to the T terminal is developed by a timer mechanism which supplies these signals at regular intervals. However, in the present case the timer signal is generated as a function of the speed of the faster one of the two front wheels.

The comparator 70, which generates this signal includes separate flip-flop counters for the left and right front wheels. The flip-flops 120, 121, 122, and 123 deliver a signal to the NAND gate 124 once for every 15 pulses of the signal generated by the converter 62, which is representative of the speed of the right front wheel. Similarly, the flip-flops 125, 126, 127 and 128 change the state of the NAND gate 129 one for every 15 pulses of the signal generated by the converter 64, which is representative of the speed of the left front wheel. When the NAND gate 130 receives a signal from either the gate 124 or the gate 129, a pulse is delivered through the amplifier 132 to the T terminals of the flip-flops 86 and 86a. Thus, the comparator 70 is effective to "count" the left and right wheels for a period of time and then select the wheel having the highest count as the output signal.

The output signal of the gate 130 is also used to reset all counters. To avoid a premature reset the reset signal is delayed slightly by the network comprising the capacitor 134, the gate 136 and the resistor 138 and gate 130, the output of the gate 136 being fed to the reset terminals of all of the flip-flops of the front and rear wheel counters.

The operation of the system thus far described will now be considered under various conditions of vehicle operation.

First, let it be assumed that the vehicle is traveling under conditions which do not require the application of brakes. Let it also be assumed that the memory selector 80 is adjusted so that the gate 82 will accept a 14-pulse signal and the corresponding gate 82a will accept a 7 pulse signal. Under the assumed conditions all of the vehicle wheels will be rotating at essentially the same speed, although slight differences in rotational speed may be produced by variations in tire size, tire wear or other mechanical factors. Normally, because of the previous action of the system, the output of the flip-flops 86 and 86a will be low. No signal will be supplied to the amplifiers 87 and 87a, solenoids 88 and 90 will be deenergized and the valves 48 and 50 will be in their normal position in which they exert no effect on this system. The frequency of the pulses generated by the converters 62, 64, 66 and 68 will be essentially equal. When 7 pulses have been counted, the gate 82a will change state with the resultant delivery of signals to the S and C terminals of the flip-flop 86a, which will not change state because of the absence of the signal at the timer input T. At the same time the output signal from the gate 82a is delivered to the S and C terminals of the flip-flop 112a, thus inhibiting further counting action and the signal will remain unchanged at the S and C terminals of the flip-flop 86a. At a count of 14 pulses, the gate 82 will change state delivering signals to the S and C terminals of the flip-flop 86 and to the S and C terminals of the flip-flop 112, thus inhibiting further counting and maintaining the signal at the S and C terminals of the flip-flop 86. Subsequently a 15 count will be reached by the flip-flops 120–123 or by the flip-flops 125–128, either of which conditions changes the state of the gate 130 supplying a signal to the T terminals of the flip-flops 86 and 86a. The pulse on the T input to the flip-flops 86 and 86a will cause the output to change to a low value or if the output had been low, in accordance with the assumption made, the pulse has no affect. The pulse delivered by the gate 130 is also fed through the delay network 134, 136 and 138 to the reset terminals of all of the flip-flops, thus restarting the count.

Next, let it be assumed that moderate braking force is required. The vehicle operator actuates the brake pedal in the normal manner to produce the required braking action. Under normal conditions this will result in a reduction of vehicle speed but will not change the relative velocity of the wheels. Thus, the count and the overall action of the control system will continue to be as described above. The output of the flip-flops 86 and 86a will continue to be low and the position of the valves 48 and 50 will be unchanged.

Next, let it be assumed that the braking effort is increased to the point at which the dynamic rear-to-front weight shift and other factors creates an incipient tendency of the rear wheels to lock, thus reducing the speed of at least one of the rear wheels, with respect to the speed of at least one of the front wheels. It is immaterial whether or not both of the rear wheels tend to slow down since, as explained above, the comparator 72 g generates an output signal which is a function of the slower of these wheels. Under the assumed conditions the 7 pulse count will be completed and the signal supplied to the flip-flop 86a before the 15 count is completed by the front wheel comparator 70 and fed to the T terminal of the flip-flop 86a. Accordingly, the output of the flip-flop 86a will remain low as before.

However, the decrease in rotational velocity of at least one of the rear wheels is sufficient to delay completion of the 14 pulse count with the result that the front wheel comparator will deliver a pulse to the terminal T of the flip-flop 86 at a time when there is no corresponding pulse delivered to the terminal C. This will cause the flip-flop 86 to change from low to high energizing the amplifier 87 and actuating the solenoid 88 of valve 48. As explained in detail in the aforesaid copending application, Ser. No. 662,448 the closing of the valve 48 effectively isolates the rear brakes from the pedal 34, thus preventing the development of increased braking pressure at the rear wheels. This produces what is generally regarded as the ideal condition at the rear wheels, i.e., the application of sufficient braking force to cause the rear wheels to tend lock but which does not produce an actual wheel locked condition.

The system will continue in this mode of operation until the differential between the speed of the rear wheels and the speed of the front wheels is decreased or increased. If the former condition occurs, the signal will be delivered to and maintained at the S and C terminals of the flip-flop 86 when the pulse from the front wheel comparator is delivered to the T terminal. When this occurs the flip-flop will change state and the output will become low, deenergizing the solenoid 88 and restoring the valve 48 to its normal position thereafter permitting normal operation of the brake system.

If, however, the tendency of the rear wheels to lock becomes greater, resulting in a further reduction of the speed of the rear wheels, the 7 pulse count at the gate 82a will be delayed and the front wheel comparator will deliver a signal to the T terminal of flip-flop 86a in the absence of a signal to the C terminal, thus causing the output of the flip-flop 86a to be high, energizing the amplifier 87a and the solenoid 90 of the valve 50. As explained in detail in the copending application 662,448 the actuation of the valve 50 bleeds air from the conduits 52, 54 and 56, thus reducing the braking effort at the rear wheel actuators 22 and 24. This causes a reduction in the differential between the speed of front and rear wheels. The resultant relative increase in speed of the rear wheels is sufficient to permit the 7 pulse to be completed and the signal to be delivered and maintained at the S and C terminals of the flip-flop 86a prior to the completion of a 15 pulse count at the front wheel comparator and delivery of the resultant signal to the T terminal of the flip-flop 86a. The output of flip-flop 86a changes from high to low, deenergizing the solenoid 90 and restoring the valve 50 to its normal position and returning the system to its hold mode of operation. This system will remain in this mode of operation until, again, there is an increase or decrease in the differential between the speed of the rear and front wheels.

Thus, the system of the present invention permits the brakes to be applied initially with sufficiently high force to produce a tendency toward lockup at the rear wheels which is the desired braking condition. The optimum braking force is thereafter maintained by automatically increasing or decreasing the actual braking force to meet the constantly changing dynamic conditions, which are constantly monitored by the counting system. Since the control system is responsive to minor departures from the ideal braking condition, the braking effort never departs significantly from the optimum conditions.

It is generally recognized that under extreme conditions the application of full braking pressure to all wheels is desirable even though such application may result in locking of all or some of the wheels with partial or complete loss of directional control of the vehicle. The operation of the brakes in this manner, is, in fact, a requirement of existing and pending legislation. The system, thus far described, will operate, under most circumstances, automatically in this manner. However, to assure that the system of the present invention will meet these requirements and to be certain that the control system is completely deenergized when the vehicle is stopped, a zero speed override unit is provided.

The unit 102 comprises an integrator network 142, including gates 144 and 146, capacitor 148 and resistor 150, which is, in effect, a "pulse stretcher," producing, in a typical case, one output signal for each 5 pulses delivered by the gate 130. The output of the integrator 142 is fed through a diode 152 and the parallel capacitor 154 to the gate 156. The values of the capacitors and resistors are selected so that, at all vehicles speeds above 2 miles per hour, the input to the gate 156 is maintained high and its output low. At wheel speeds below 2 miles per hour, however, either because of front wheel lock of because the vehicle is coming to a stop, the input to the gate 156 changes to low, its output becomes high and an override signal is supplied to the flip-flops 86 and 86a through leads 153, 155 and 157, which maintains the output of the flip-flops low regardless of the S, T and C terminals of these flip-flops.

Thus, the valves 48 and 50 will occupy their normal position rendering the control system ineffective whenever the vehicle is at rest or the speed of the front wheels is less than the speed of the rear wheels. Accordingly, in the event of front wheel lockup full braking pressure may be supplied to all the wheels.

The modified system of FIG. 3, to which detailed reference will now be made, is essentially the same as the system previously described. However, the signal indicative of the speed of the rear wheels is fed to the logic switches 74 and 76 through a summation comparator 160 rather than the high comparator 72. The outputs of the converters 66 and 68 are fed separately to the summation comparator which is essentially a NOR gate. The output of the unit 160 is a summation of both pulse rates on the left and right rear wheel and is, thus, the function of both the left and right rear wheel speeds giving each wheel half control of the output signal fed to the logic switches. For generating a signal indicative of the average speed of the front wheels a summation comparator 162 is substituted for the low comparator 70. The output of the summation comparator 162 is fed to the logic switches and is also fed through an internal time delay network (not shown) which may be the same as that included in the comparator 70, to the zero speed override unit 102, from which it is passed to the logic switches 74 and 76 as before.

The operation of the system of FIG. 3 is the same as the operation of the system of FIGS. 1 and 2, except that the system acts in response to differences between the average velocity of the left and right front wheels as compared to the average velocity of the left and right rear wheels.

It is to be understood that in either form of the control system the comparators may be reversed, i.e., the comparators which are associated with the front wheels may be applied to the rear wheels and vice versa. The installation of the comparators in any particular case will depend primarily on the normal vehicle loading, the normal front to rear weight distribution, and the particular control action desired.

The invention may be embodied in other specific forms without departing from the spirit or essential characteristics thereof.

What is claimed and desired to be secured by Letters Patent is:

1. In a vehicle brake system in which pressurized fluid is normally supplied from a pressure source to the brakes for a front vehicle wheel set and at least one rear vehicle wheel set under the control of an operator, means to modify the operator-controlled fluid pressure applied to the brakes of one wheel set, a switch for controlling the operation of said pressure modifying means, said switch actuating said pressure-modifying means upon receipt of an activating signal and deenergizing said pressure-modifying means upon receipt of an inhibiting signal, means for generating said activating and inhibiting signals comprising means for generating a first pulse signal, the frequency of which is a function of the rotational velocity of at least one wheel of one said wheel sets, means for counting said first pulse signal and for delivering to and maintaining at said switch an inhibiting signal upon the completion of a predetermined count, means for generating a second pulse signal having a frequency which is a function of at least one wheel of the other wheel set, means for counting said second pulse signal and for delivering to said switch an activating signal upon the completion of a predetermined count, said counting means being so arranged that said inhibiting signal will be delivered to said switch before said activating signal, except when the frequency of said first pulse signal is less than the frequency of said second pulse signal by a predetermined amount.

2. The braking system, according to claim 1 together with means responsive to a decrease in the frequency of said second pulse signal below a predetermined amount for delivering an override signal to said switch to maintain said pressure-modifying means deenergized.

3. In a vehicle brake system in which pressurized fluid is normally supplied from a pressure source to the brakes for a front vehicle wheel set and at least one rear vehicle wheel set under the control of an operator, means to modify the operator-controlled fluid pressure applied to the brakes of said rear wheel set, a bistable switching means responsive to set and reset signals to respectively energize and deenergize said pressure-modifying means, a first counting means responsive to input signals representative of rear wheel rotational speed to provide a first counter output pulse indicative of a predetermined count, a second counting means responsive to input signals representative of front wheel rotational speed to provide a second counter pulse indicative of a predetermined count, said two predetermined counts differing by at least one count, a circuit connecting the output of one of said first counter means to said bistable switch means and to the input of said first counter means to simultaneously reset and inhibit setting of said bistable switch means and to block receipt by said first counter means of further associated wheel rotation input signals, a circuit connecting the output of said second counter means to the set input of said bistable switch means and to a reset circuit for all said counting means to switch said bistable switch means, when uninhibited, to set condition and to reset all said counting means to start of count condition.

4. In a brake system as defined in claim 3, a branch output circuit connecting said second counter means to the reset circuit of said bistable switch and including a time-delayed circuit to enable complete inhibition of operation of said pressure-modifying means in the event said second counter 5. In a vehicle having a front ground-engaging wheel set and at least one rearwardly disposed ground-engaging wheel set, at least one of said wheel sets having brakes to which pressurized fluid is supplied under the control of an operator, means to modify the operator-controlled fluid pressure applied to the brakes of said one wheel set comprising a switch for controlling the operation of said pressure-modifying means, said switch actuating said pressure-modifying means upon receipt of an activating signal and deenergizing said pressure-modifying means upon receipt of an inhibiting signal, means for generating said activating and inhibiting signals comprising means for generating a first pulse signal, the frequency of which is a function of the rotational velocity of at least one wheel of one of said wheel sets, means for counting said first pulse signal and for delivering to and maintaining at said switch an inhibiting signal upon the completion of a predetermined count, means for generating a second pulse signal having a frequency which is a function of at least one wheel of the other wheel set, means for counting said second pulse signal and for delivering to said switch an activating signal upon the completion of a predetermined count, said counting means being so arranged that said inhibiting signal will be delivered to said switch before said activating signal, except when the frequency of said first pulse signal is less than the frequency of said second pulse signal by a predetermined amount.

6. The combination according to claim 5 together with means responsive to a decrease in the frequency of one of said pulse signals below a predetermined amount for delivering an override signal to said switch.

7. In a vehicle brake system in which pressurized fluid is normally supplied from a pressure source to the brakes for at least one vehicle wheel set under the control of an operator, means to modify the operator-controlled fluid pressure applied to said brakes comprising, means for generating a first series of pulses, the frequency of which is a function of vehicle speed, means for generating a second series of pulses, the frequency of which is a function of the speed of at least one wheel of said set, means for periodically counting the pulses in each series up to a predetermined number and then repeating said count, the pulse generating and counting means being effective, when the speed of said wheel corresponds to the speed of said vehicle, to complete the count of said second series before completion of the count of said first series and being effective to complete the count of said first series before the completion of the count of said second series when the speed of said wheels decreases a predetermined amount with respect to the speed of said vehicle, and means responsive to the completion of the count of said first series before completion of the count of said second series to limit the pressure applied to the brakes of said wheels.

8. The brake system according to claim 7 together with means for inhibiting the action of said last-mentioned means when the vehicle speed is below a predetermined value.

9. In a vehicle brake system in which pressurized fluid is normally supplied from a pressure source to the brakes for at least one vehicle wheel set under the control of an operator, means to modify the operator-controlled fluid pressure applied to said brakes comprising means for generating a first series of pulses, the frequency of which is a function of the vehicle speed, means for generating second and third series of pulses, the frequency of each which is a function of the speed of at least one wheel, of said set, means for periodically counting the pulses in each series up to a predetermined amount and then repeating said count, the pulse generating and counting means being effective, when the speed of said wheels corresponds to the speed of said vehicle, to complete the count of said second and third series before completion of the count of said first series and being effective to complete the count of said first series before completion of the count of said second and third series when the speed of said wheels decreases a predetermined amount with respect to the speed of said vehicle, and means responsive to the completion of the count of said first series before the completion of the count of said second and third series to relieve the pressure applied to said brakes.

PO-1050
(5/69)

UNITED STATES PATENT OFFICE
CERTIFICATE OF CORRECTION

Patent No. 3,608,978      Dated September 28, 1971

Inventor(s) JAMES C. NEISCH

It is certified that error appears in the above-identified patent and that said Letters Patent are hereby corrected as shown below:

Column 4, line 16, after "comprising" change "a" to read "4";

line 24, after "permit" delete "it";

line 56, change "one" to read "once".

Column 5, line 53, after the numeral "72" delete "g"

line 66, after "change" insert ---state---.

Column 6, line 9, after "normal" insert ---open---;

line 25, after "pulse" insert ---count---;

line 70, change "of" (second occurrence) to read "or".

Column 7, line 15, after "right" delete "rear";

line line 55, after "one" (second occurrence) insert ---of---.

Column 8, line line 11, after "counter" insert ---output---;

line 23, after "means to" insert ---a---;

line line 28, after "counter" insert ---means provides output pulses lower than at a predetermined rate.---;

line 75, after "decreases" delete "and".

Column 9, line 15, change "of each" to read "each of".

Signed and sealed this 28th day of March 1972.

(SEAL)
Attest:

EDWARD M. FLETCHER, JR.
Attesting Officer

ROBERT GOTTSCHALK
Commissioner of Patents